US011260710B2

(12) United States Patent
Angermann et al.

(10) Patent No.: US 11,260,710 B2
(45) Date of Patent: Mar. 1, 2022

(54) TRAILER COUPLING WITH A COUPLING ARM

(71) Applicant: WESTFALIA-AUTOMOTIVE GMBH, Rheda-Wiedenbruck (DE)

(72) Inventors: Kay Angermann, Dobeln (DE); Florian Becker, Stemwede (DE); Waldemar Gross, Munster (DE); Bjorn Kleinhans, Herzebrock-Clarholz (DE); Marc Weiner, Gutersloh (DE)

(73) Assignee: WESTFALIA-AUTOMOTIVE GMBH

( * ) Notice: Subject to any disclaimer, the term of this patent is extended or adjusted under 35 U.S.C. 154(b) by 275 days.

(21) Appl. No.: 16/331,560

(22) PCT Filed: Sep. 8, 2017

(86) PCT No.: PCT/EP2017/072573
§ 371 (c)(1),
(2) Date: Mar. 8, 2019

(87) PCT Pub. No.: WO2018/046658
PCT Pub. Date: Mar. 15, 2018

(65) Prior Publication Data
US 2019/0210419 A1 Jul. 11, 2019

(30) Foreign Application Priority Data

Sep. 9, 2016 (DE) .......................... 102016117017.8

(51) Int. Cl.
*B60D 1/54* (2006.01)
*B60D 1/06* (2006.01)
(52) U.S. Cl.
CPC ................. *B60D 1/54* (2013.01); *B60D 1/06* (2013.01); *B60D 2001/544* (2013.01)

(58) Field of Classification Search
CPC ...... B60D 1/54; B60D 1/06; B60D 2001/544; B60D 1/485; B60D 1/56
(Continued)

(56) References Cited

U.S. PATENT DOCUMENTS

| 5,205,574 A | * | 4/1993 | Heath | ...................... B60D 1/52 |
|---|---|---|---|---|
| | | | | 184/38.1 |
| D369,581 S | * | 5/1996 | McCoy | ........................ D12/162 |

(Continued)

FOREIGN PATENT DOCUMENTS

| DE | 19715469 A1 | * | 10/1998 | ............... B60D 1/06 |
|---|---|---|---|---|
| DE | 20003480 | | 5/2000 | |

(Continued)

OTHER PUBLICATIONS

Patent Cooperation Treaty (PCT), International Search Report and Written Opinion for Application PCT/EP2017/072573 filed Sep. 8, 2017, dated Dec. 5, 2017, International Searching Authority, EP.

(Continued)

*Primary Examiner* — Minnah L Seoh
*Assistant Examiner* — Myles A Harris
(74) *Attorney, Agent, or Firm* — McDonald Hopkins LLC (57) ABSTRACT

The invention relates to a trailer coupling for a motor vehicle, with a coupling arm (11, 111, 211), on the free longitudinal end region (12) of which a coupling body (13), in particular a coupling ball (14), for the coupling of a trailer (190) or a load carrier (290) is arranged, and the other longitudinal end region (15) of which forms a holding end (16) for holding and/or movable mounting on a supporting structure (70) of the motor vehicle (90), wherein the coupling arm has supporting straps (20, 21) which extend along a longitudinal extent of the coupling arm at a transverse distance (22) to each other between the longitudinal end regions (12, 15). It is provided that the supporting straps (20, (Continued)

21) are connected to each other by a plurality of connecting struts (26-31) in the manner of a lattice structure (24) or rib structure (25).

35 Claims, 5 Drawing Sheets

(58) Field of Classification Search
USPC .................................. 280/491.3, 491.1, 511
See application file for complete search history.

(56) References Cited

U.S. PATENT DOCUMENTS

| | | | | |
|---|---|---|---|---|
| D369,582 S | * | 5/1996 | McCoy | .......................... D12/162 |
| D397,067 S | * | 8/1998 | McCoy | .......................... D12/162 |
| 5,873,594 A | * | 2/1999 | McCoy | .................... B60D 1/46 |
| | | | | 280/483 |
| 6,010,142 A | * | 1/2000 | McCoy | .................... B60D 1/46 |
| | | | | 280/490.1 |
| D431,216 S | * | 9/2000 | Belinky | ........................ D12/162 |
| 6,139,043 A | * | 10/2000 | Gries | ........................ B60D 1/00 |
| | | | | 280/491.5 |
| D475,327 S | * | 6/2003 | McCoy | .......................... D12/162 |
| 8,979,112 B2 | * | 3/2015 | Weipert | ................... B60D 1/07 |
| | | | | 280/491.5 |
| 9,114,678 B1 | | 8/2015 | Olson et al. | |
| 9,199,520 B2 | * | 12/2015 | Weipert | ................... B60D 1/46 |
| 9,849,741 B2 | | 12/2017 | Rimmelspacher | |
| 2005/0173893 A1 | | 8/2005 | Buckley et al. | |
| 2010/0133785 A1 | | 6/2010 | McCoy | |
| 2011/0031718 A1 | * | 2/2011 | Di Parma | ................. B60D 1/44 |
| | | | | 280/504 |
| 2013/0093162 A1 | * | 4/2013 | Gentner | ................... B60D 1/06 |
| | | | | 280/498 |
| 2014/0210185 A1 | * | 7/2014 | Pietschmann | ............ B60D 1/48 |
| | | | | 280/495 |
| 2016/0176251 A1 | * | 6/2016 | Mutlu | ...................... B60D 1/54 |
| | | | | 280/491.3 |
| 2020/0180374 A1 | * | 6/2020 | Gentner | ................... G01L 5/136 |

FOREIGN PATENT DOCUMENTS

| | | | | |
|---|---|---|---|---|
| DE | 102009050932 | | 5/2010 | |
| DE | 102009050932 A1 | * | 5/2010 | ............... B60D 1/06 |
| DE | 202013000779 | | 1/2014 | |
| DE | 102015100490 | | 7/2016 | |
| EP | 0872364 | | 10/1998 | |
| EP | 3045328 | | 7/2016 | |
| EP | 3045328 A1 | * | 7/2016 | ............... B60D 1/56 |

OTHER PUBLICATIONS

"Foreign Design Involving Ribs and Bosses," ASM Handbook, vol. 14A, p. 741-758. 2005.
Ak41—detachable tow ball, operating manual, date Jan. 14, 2014.

* cited by examiner

TRAILER COUPLING WITH A COUPLING ARM

CROSS-REFERENCE TO RELATED APPLICATION

This application is a 35 U.S.C. § 371 national stage application of PCT Application No. PCT/EP2017/072573 filed on Sep. 8, 2017, entitled "TRAILER COUPLING WITH A COUPLING ARM," which claims priority to German Patent Application No. 102016117017.8, filed on Sep. 9, 2016, entitled "TRAILER COUPLING WITH A COUPLING ARM", each of which are incorporated herein in their entirety by reference.

The invention relates to a trailer coupling for a motor vehicle, with a coupling arm, on the free longitudinal end region of which a coupling body, in particular a coupling ball, for the coupling of a trailer or a load carrier is arranged, and the other longitudinal end region of which forms a holding end for holding and/or movable mounting on a supporting structure of the motor vehicle, wherein the coupling arm has supporting straps, which extend along a longitudinal extent of the coupling arm at a transverse distance to each other between the longitudinal end regions.

Coupling arms generally have a T-shaped or double T-shaped cross section, i.e. opposing, supporting straps extending along the longitudinal extent of the coupling arm. In the case of a double T-shaped cross section, the supporting straps form, for example, upper and lower supporting straps with respect to the use position of the coupling arm. In the case of a T-shaped cross section, an upper supporting strap is provided, which is wider in relation to the use position of the coupling arm, from which a web protrudes which constitutes the lower supporting strap as a whole or the free end region of which constitutes the lower supporting strap.

In the case of a coupling arm known from DE 10 2009 050 932 A1, a receiving opening is provided for a breakaway cable of a trailer between the supporting straps for example. Consequently, the coupling arm is slightly lighter. Furthermore, this document shows a coupling arm in which a breakthrough is provided for a socket or trailer contact unit, which extends transversely to the longitudinal extent of the coupling arm between the supporting straps. Hence, it is customary for the supporting straps to be connected to each other by means of a web on which individual breakthroughs are provided if needed. However, the known coupling arms are heavy, which is counterproductive for the increasing trend towards lightweight construction in motor vehicles.

The object of the present invention is therefore to provide a load-bearing, but light trailer coupling.

In order to achieve the object, provision is made in a trailer coupling of the type mentioned in the introduction that the supporting straps are connected to each another by a plurality of connecting struts in the manner of a lattice structure or rib structure.

It is a basic concept of the present invention that the supporting straps transmit the main load from the coupling body, as it were, in a manner known per se in the direction of the holding end, which occurs during driving operation, i.e. when the coupling arm is used with a load carrier or a trailer. Thus, through the supporting straps, tensile forces, compressive forces, vertical loads and the like can be transmitted from the coupling body in the direction of the vehicle by means of the supporting straps. A plurality of connecting struts, which provide rigidity for the coupling arm and transmit forces from one supporting strap to the other supporting strap, is provided between the supporting straps. Thus, for example, tensile stress or compressive stress acting on an upper supporting strap can be transmitted to the lower supporting strap via the connecting struts and, conversely, a similar transmission of force from the lower supporting strap to the upper supporting strap can take place.

The connecting struts form a type of lattice structure or rib structure which transmits forces between the supporting straps as required thus reinforcing the coupling arm without the latter being excessively heavy.

Through-openings or also wall sections are provided between the connecting struts, for example, which, however, have a smaller cross section than the connecting struts and thus contribute to the lightweight construction. By implication, such wall sections can also contribute to the reinforcement or increased load-bearing capacity of the coupling arm.

At predetermined locations, gaps between the connecting struts can be used for further functions, for example, for accommodating a trailer contact unit, a breakaway cable or the like.

Preferably, a plurality or large number of connecting struts are provided along the longitudinal extent of the coupling arm, for example, at least three connecting struts, at least four connecting struts, at least five connecting struts or the like.

The connecting struts can, for example, be arranged one behind the other in a row arrangement with respect to the longitudinal extent.

It is also possible for connecting struts to cross each another and/or to be supported against each another.

As explained, it is advantageously possible that a through-opening is provided between at least two connecting struts. The through-opening makes it possible for objects, for example, a breakaway cable or the like, to be guided transversely to the longitudinal extent through the gap between the connecting struts and the supporting straps. The through-opening can also be used for example, to house a socket or other contact unit for producing electrical and/or optical connections between an on-board electrical system of the motor vehicle and a trailer or load carrier. It goes without saying that a plurality of such through-openings can be present.

It is also advantageous however, if at least one wall section is provided transversely to the longitudinal extent of the coupling arm between at least two connecting struts arranged one behind the other along the longitudinal extent. At least one connecting strut, preferably both connecting struts, which are arranged next to the wall section, project transversely with respect to the longitudinal extent to at least one side. It is preferred if the connecting struts, which are arranged one behind the other along the longitudinal extent, project on opposing sides in each case in front of the at least one wall section. Thus, the wall section is, as it were, reinforced on both sides by the connecting struts. It should also be stipulated in this context that a plurality of gaps, as it were closed by wall sections, can be provided between connecting struts arranged behind each other or next to each other in the longitudinal extent of the coupling arm.

By implication, combinations of this measure and the measures explained previously are also possible, i.e. at least one through-opening or a plurality of through-openings between connecting struts and at least one wall section or a plurality of wall sections between connecting struts are provided on one and the same coupling arm.

Preferably, at least one of the supporting straps, preferably both supporting straps or all supporting straps, project from at least one side in front of the at least one wall section. The wall section is thus, as it were, narrower than the supporting straps in the cross section of the coupling arm with respect to the longitudinal extent, while at least one of the supporting straps projects in front of the wall section transversely to the longitudinal extent on one or both sides.

It is possible, for example, for the supporting straps and the wall section to form a T-shaped or double T-shaped cross section. A double T-shaped cross section should be understood as a cross section, which is designed in the manner of a double-T profile, i.e. the two letters T are oriented in opposite directions to each other as it were. The cross section can also be bone-shaped.

It is also advantageous if the wall section is narrower than at least one of the supporting straps and is formed on a region of the other supporting strap furthest away from this supporting strap as an integral component of said wall section or is formed by the wall section. The wall section forms, as it were, a web, which projects from the one supporting strap and the free end region thereof or from the region furthest away from this supporting strap forms or constitutes the other supporting strap. The connecting struts, which have already been mentioned, run laterally on said wall section between the two supporting straps. The wider supporting strap can, for example, form an upper or lower supporting strap based on the use position of the coupling arm.

An advantageous concept proposes that the coupling arm has a uniform cross section on one or both of the longitudinal end regions, for example a substantially triangular or circular or oval cross section, a T-shaped or double T-shaped cross section, and/or no connecting strut. Hence, the connecting struts are advantageously provided on a central section between the longitudinal end regions or do not in any case extend as far as one or both longitudinal end regions, which is possible, however. It is also possible that no supporting strap is configured on at least one longitudinal end region, but that the above-mentioned uniform round, oval, elliptical or triangular cross section is provided.

It is advantageous that one or more connecting struts run, as it were, at right angles to at least one of the supporting straps, in particular at right angles to a longitudinal extent of the coupling arm or are oriented at right angles to the supporting strap and/or the longitudinal extent of the coupling arm. At right angles should be understood as a 90° angle in this context, but also a slight deviation thereof, for example between 87-93°.

It may be preferred and for the purpose of optimum force transmission if one or more of the connecting struts run obliquely. An advantageous measure makes the provision for example that at least one connecting strut has an oblique inclination with respect to the longitudinal extent of the coupling arm. As a result of the oblique inclination, optimum introduction or transmission of force from one supporting strap to the other supporting strap can be achieved by means of the connecting strut, for example, based on a curvature or an arc of the coupling arm.

However, as mentioned above, it is also possible for one or more of the connecting struts to be oriented substantially at right angles to at least one of the supporting straps with respect to the longitudinal extent of the coupling arm.

A combination of connecting struts which are obliquely inclined towards at least one supporting strap or substantially at right angles with respect to the longitudinal extension or the longitudinal extent of the coupling arm is possible by implication.

A preferred concept makes the provision that the coupling arm has at least two connecting struts arranged one behind the other along the longitudinal extent, which have an oblique inclination in opposite directions with respect to the longitudinal extent of the coupling arm. Said connecting struts can be arranged in an X-shaped or V-shaped manner, for example. In general terms, it is essentially possible for the connecting struts inclined in opposite directions to cross one another or to be arranged one behind the other with respect to the longitudinal profile without crossing. The obliquely inclined connecting struts can, for example, transmit optimally opposed forces, for example tensile forces and shearing forces or vertical downward-acting supporting forces or, in the opposite direction, vertical upward-acting, as it were negative supporting forces or tensile forces, as they occur in particular when passing over raised camber, between the supporting straps which are connected by them.

It is also possible for two or more connecting struts to have an oblique inclination in the same direction with respect to the longitudinal extent of the coupling arm. These connecting struts can be arranged directly next to one another in relation to the longitudinal extent of the coupling arm. However, it is also possible for a gap to be present between connecting struts which are inclined in the same direction in this manner, in which another connecting strut, not inclined in the same direction, for example inclined in the opposite direction or running at right angles to the supporting strap and/or to the longitudinal extent of the coupling arm, is arranged.

Both the connecting struts inclined in the opposite direction and in the same direction with respect to the longitudinal extent can have different oblique angles of inclination with respect to one or both of the supporting straps.

It is preferred if the coupling arm has at least one receptacle for a contact unit, for example a socket, for producing electrical and/or optical connections between an on-board electrical system of the motor vehicle and a trailer or load carrier. The contact unit has electrical and/or optical contacts, for example. Lighting for a trailer or load carrier can be supplied with power by means of the contact unit for example. The on-board electrical system can be constituted by a trailer control device, for example, i.e. electrical and/or optical connections are present between the control unit and the contact unit. The receptacle can be a through-opening into which the contact unit is slotted. Thus, the contacts for the trailer or load carrier can stand ready on one side of the through-opening and on the other side of the through-opening, a cable or other line can lead out of the contact unit to the control device or the on-board electrical system for example. It is also possible for the receptacle to have a base, i.e. that it is open only on one side. Preferably, one longitudinal axis of the receptacle runs transverse to the longitudinal extent of the coupling arm.

In principle, it is possible for the receptacle to be provided on one of the wall sections referred in the introduction, for example, as a through-borehole or a borehole with a bottom in the wall section.

A preferred embodiment makes provision for the receptacle to be defined on at least one side, preferably on both sides, by a connecting strut extending between the supporting straps. An advantage is achieved by virtue of the fact that the connecting struts constitute, as it were, lateral holders or supports for the contact unit. The free space, which is present anyway between the connecting struts, is used to advantageously accommodate a contact unit there.

However, it is possible by implication and is also the case in the exemplary embodiment illustrated in the drawing, that further connecting struts are present in addition to one or more connecting struts which define the sides of the receptacle for the contact unit. A preferred exemplary embodiment makes the provision that the coupling arm, with respect to the longitudinal extent thereof, has at least one connecting strut, preferably a plurality of connecting struts at a distance from the receptacle for the contact unit. Thus, with respect to the longitudinal extent of the coupling arm, further connecting struts spaced apart from the receptacle for the contact unit, are advantageous. It is possible in this case that the receptacle for the contact unit is arranged close to the coupling body, in particular the coupling ball, i.e. no or no more than one or two connecting struts are arranged close to the free end region of the coupling arm and between the receptacle for the contact unit and the coupling body, while a plurality of connecting struts are provided between the receptacle for the contact unit and the holding end of the coupling arm.

It is advantageous if the transverse distance between the supporting straps in the region of the receptacle for the contact unit is greater than in relation to the longitudinal extent of the coupling arm next to the receptacle for the contact unit. Hence, the supporting straps are at a greater distance from each other in the region of the contact unit, so that the contact unit can be comfortably accommodated there.

At least one of the supporting straps advantageously extends on the lower side or the upper side of the coupling arm, when the latter assumes its use position projecting from the rear of a motor vehicle which is suitable for carrying a load carrier or pulling a trailer. However, it is also possible by implication for at least one supporting strap to constitute as it were a lateral supporting strap, i.e. the supporting strap is arranged not at the top or at the bottom in the use position of the coupling arm, but runs on the transverse side thereof.

It is advantageously provided that a cross section of the coupling arm through at least one connecting strut, which connects the supporting straps lying opposite each other at a transverse distance to each other, is triangular or V-shaped.

Furthermore, it is advantageous if a supporting strap transverse to the longitudinal extent of the coupling arm is at least twice as wide, preferably at least three times as wide, or in any case at least somewhat wider than a further supporting strap or the other supporting strap.

The wider supporting strap can, for example, form the upper supporting strap in the use position of the coupling arm, the narrower supporting strap the lower supporting strap in the use position of the coupling arm, or vice versa.

A connecting strut, which has, for example, a round, in particular circular or elliptical cross section, is also possible by implication.

It is also possible for an outer circumferential contour of the coupling arm in the region of at least one connecting strut to be bone-shaped or triangular or V-shaped.

The coupling arm is advantageously made entirely or partly of metal, in particular ferrous metal, steel, aluminium or the like. The coupling arm can also consist of metal alloys or have metal alloys.

Furthermore, it is possible for the coupling arm to be made entirely or partly of plastic, in particular of a fibre-reinforced plastic. The plastic can be reinforced with carbon fibres or glass fibres, for example.

Provision is made in particular that the supporting straps and the connecting struts consist of at least one of the aforementioned metals or of a metal alloy or of plastic.

It is advantageous if the material of the supporting straps and of the connecting struts is the same material, for example steel, aluminium or the like.

It is particularly advantageous if the connecting struts and the supporting straps are formed as a single piece or are produced from a blank or in a cast.

An advantageous measure makes the provision that at least one connecting strut and/or at least one supporting strap have a rounded or curved outer contour on at least one transverse outer side.

The radii or curves enable, in particular, a uniform and load-oriented design of fibre structures in the arrangement when the coupling arm is produced by means of solid forming, for example forging or the like.

It should be mentioned at this point that in particular hot forming in the range of 950-1250° is advantageous. So-called die forging is used as an advantageous method for producing the coupling arm for example.

High-strength structural steels, in particular S355, are suitable for producing a coupling arm according to the invention. Furthermore, so-called AFP steels, such as 30MnVS6 or 38MnVS6, are also advantageous. The concept according to the invention also enables, in particular, the use of heat-treated steels such as, for example, 42CrMo4 or 20NiMoCr with corresponding heat treatment by quenching and tempering (hardening and annealing) to produce the coupling arm. Furthermore, bainitic steels, such as, for example, H2 steel, in which the strength properties of the bainite and of the dynamic load capacity associated with this are used in a specific manner, are worth mentioning as suitable materials for the coupling arm.

Advantageously, the coupling arm can also be advantageously produced using so-called warm forming in a temperature range of around 400-750°. So-called precision forging, also known as fine forging, in the die is suitable as a manufacturing method. Heat treatment integrated into the process or subsequent property optimisation using material-specific hardening processes are advantageous in the case of the coupling arm.

Materials such as C45 steel, for example, or also higher-alloy steels are advantageous for warm forming.

The coupling arm can also be produced by casting or other primary shaping by implication.

The coupling arm can also be made from other metals, for example aluminium.

It is advantageous for at least one connecting strut on a foot region, on which it is connected to one of the supporting straps, to have a larger cross-section than an intermediate section extending between the supporting straps. Hence, the foot region is, as it were, more solid than the intermediate section. The foot region is advantageously rounded, i.e. it proceeds advantageously with rounded or curved portions towards the respective supporting strap. This measure is also advantageous in connection with the primary shaping or reshaping, in particular hot forming, during the production of the coupling arm. In addition, a more favourable force profile from the supporting strap into the connecting strut or vice versa from the connecting strut into the supporting strap can be achieved.

The coupling arm can be substantially linear per se. However, a conventional geometry of the coupling arm is preferred in principle, in which the latter has at least one curved portion, in particular at least two curved portions, along the longitudinal extent. For example, the coupling arm runs in an arc shape in the use position, from the holding end downwards (in the direction of a road surface), it then has a straight or arc-shaped section and proceeds in an arc-shaped section on the free end region of which the coupling body is arranged.

It should be noted with regard to the coupling body that the latter is advantageously a coupling ball. However, other coupling bodies are also possible, for example plug-in receptacles, plug-in heads or the like, for attaching a load carrier for example. In particular, anti-twist contours can also be provided on the coupling body. The coupling body can have a polygonal contour.

Provision is made preferably for the cross sections of the connecting struts and/or the gaps between the connecting struts and/or an angular orientation of the connecting struts relative to each other to be adjusted in relation to a force profile along the coupling arm during use by a load carrier or trailer. Thus, for example, the connecting struts can be placed in closer proximity and/or turn out more solid in a region of greater force or of greater need for force transmission between the supporting straps. Regions in which smaller forces are to be transmitted or supported can be reinforced with correspondingly fewer connecting struts or weaker connecting struts. The angular orientation, for example a right-angled arrangement of a connecting strut relative to the supporting strap or an oblique inclination or orientation of the oblique inclination of the strut relative to the respective supporting strap can be optimally adapted to the respective load situation. It is possible using appropriate calculation programs, in particular finite element calculations and/or topology optimisations, to simulate the force profiles of a coupling arm and to reinforce the coupling arm accordingly by means of connecting struts or the configuration of the lattice structure and rib structure.

A typical force profile or load profile of a coupling arm takes account of the following measure in which provision is made for the cross sections of the connecting struts and/or the gaps between the connecting struts and/or an angular orientation of the connecting struts relative to each another to be adapted in relation to a force profile along the coupling arm during use by a load carrier or trailer.

The following measure is advantageous, in particular on a longitudinal section of the coupling arm between curved portions, but can readily be used in other regions of the coupling arm. Provision is made in the case of this measure that at least two connecting struts for transmitting tensile forces and compressive forces between the supporting straps are arranged next to each another along the longitudinal extent to compensate for tensile stresses and compressive stresses. For example, the connecting struts are inclined obliquely in opposite directions, so that they can respond to the different load situations, for example traction mode and coasting mode or shearing force and tractive force acting on the coupling arm.

Advantageously, a web projecting from a support strap at an angle, in particular forming a T-shape, is provided, wherein a section of the web furthest from the supporting strap forms or comprises the other supporting strap. The web is laterally reinforced by a plurality of connecting struts, so that the lattice structure or rib structure of the connecting struts, as it were, extends along the web. For example, the web is oriented substantially vertically in the use position of the coupling arm, while the upper supporting strap is oriented horizontally.

Although the exemplary embodiments illustrated in the drawing relate to coupling arms comprising an upper and a lower or in any case only two supporting straps, it goes without saying that, according to the principle according to the invention, further supporting straps of a coupling arm can also be connected to each other. Thus, an advantageous embodiment of the invention makes the provision that the coupling arm has at least three supporting straps, which run along edge regions of the coupling arm and of which at least two supporting straps are connected to each other by means of a plurality of connecting struts, for example, the supporting straps are arranged in a triangular manner relative to each other. Two or more, in particular all, supporting straps are connected to each other by connecting struts. The coupling arm obtains a lattice-type structure for example as a result. At least one hollow space can be provided between the supporting straps and the connecting struts connecting these. The hollow space preferably extends along the longitudinal extent of the coupling arm, at least over a partial section of the longitudinal extent.

The coupling arm can be attached to the motor vehicle in a wide variety of ways.

Provision can be made for instance for a plug-in projection to be arranged on the holding end for insertion into a plug-in receptacle of a holder of the trailer coupling which is attached or can be attached to the motor vehicle. The plug-in receptacle is provided, for example, on a plug-in sleeve or a tube.

Furthermore, a movable bearing is also possible, for example a pivot bearing and/or sliding bearing of the coupling arm with respect to a holder which is attached to the motor vehicle. Provision can be made in this case for a bearing head to be present on the holding end of the coupling arm for movable bearing on a bearing or holder which is attached or can be attached to the motor vehicle.

Finally, fixed and immovable assembly of the coupling arm on the motor vehicle is also possible. In this case, for example, there is at least one assembly contour on the holding end, for example one or more screw openings, screw bosses or the like, wherein the assembly contour is provided for assembly on the motor vehicle. The coupling arm can be screwed to the motor vehicle, for example, in particular to a cross member which runs at the rear of the motor vehicle.

Exemplary embodiments of the invention are explained below with reference to the drawings.

FIG. 9 shows a side view of a coupling arm of the trailer coupling according to FIGS. 7, 8, from which

Figure 1:
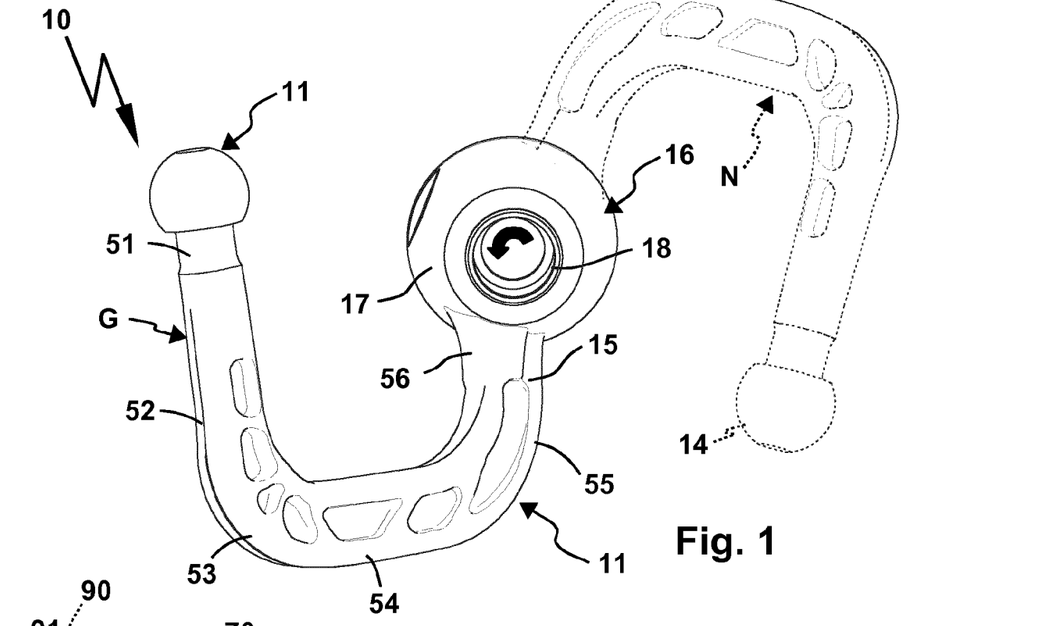
FIG. 1 shows an oblique side view of a first trailer coupling, which is shown in FIG. 2 obliquely in a perspective view from another direction.
Figure 2:
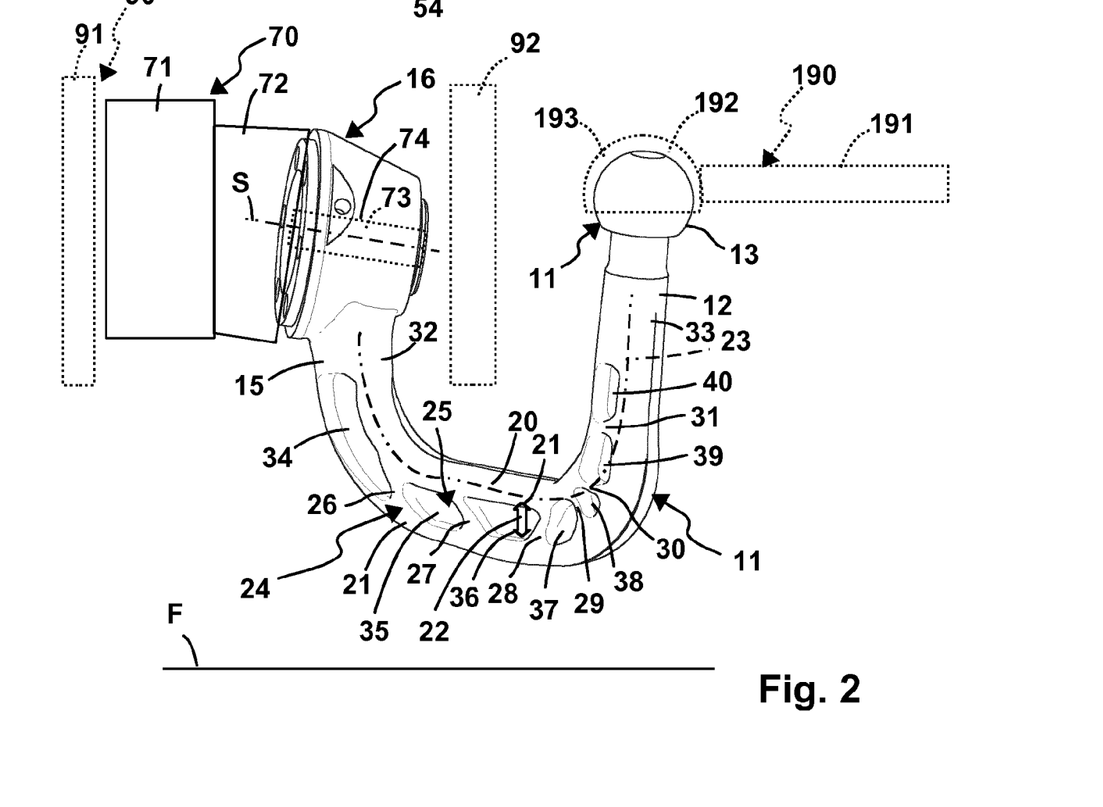
Figure 3:
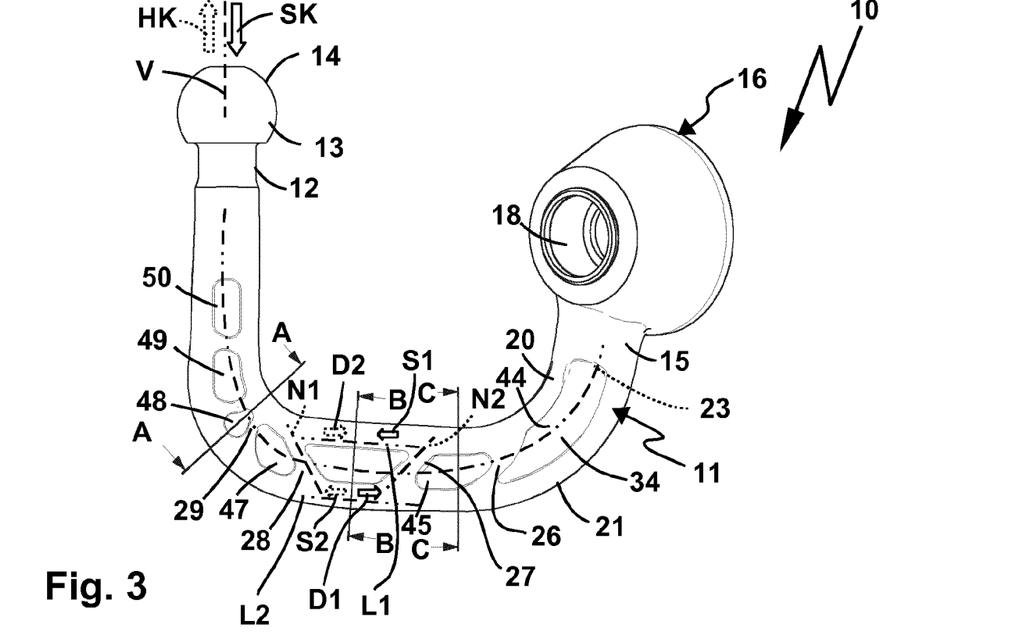
FIG. 3 shows a side view of a coupling arm of the trailer coupling according to FIGS. 1, 2.

A trailer coupling 10 has a coupling arm 11. The coupling arm 11 has a coupling body 13 on a longitudinal end region 12, for example a coupling ball 14 or another, in particular polygonal, coupling body (not shown). A longitudinal end region 15 of the coupling arm 11 opposite the longitudinal end region 12 has a holding end 16 which is provided for attaching or mounting the coupling arm 11 to or on a motor vehicle 90.

A bearing head 17, which comprises a bearing receptacle 18, is provided on the holding end 16.

A holder 72, which is arranged on a supporting structure 70, is used to attach and mount the coupling arm 11 to or on the motor vehicle 90. The supporting structure 70 comprises, for example, a cross member 71, which extends along a rear end of a body 91 of the motor vehicle 90. The supporting structure 70 is connected to the body 91 in a manner not shown, for example by means of side members extending laterally in the longitudinal direction of the vehicle and projecting from the cross member 71 at the longitudinal end regions thereof.

The holder 72 has a bearing projection 73 which engages in the bearing receptacle 18, so that the bearing head 17 is mounted in a pivotable manner about an axis of rotation S relative to the holder 72 and/or is mounted so as to be displaceable along the axis of rotation S. Displaceability of this type is used, for example, to bring fixing structures 19, in particular positive locking contours, spherical caps or the like, into engagement with mating contours (not shown) or positive locking contours on the holder 72, which extend, for example, around the bearing projection 73. Actuating means can be provided in order to achieve or produce this positive locking engagement position; however, these are not shown in the drawing.

The bearing head 17 and the holder 72, in particular its bearing projection 73, form a swivel bearing 74.

The coupling arm 11 can be pivoted between a use position G suitable for pulling a trailer 190 or supporting a load carrier 290 (see FIG. 8) by means of the swivel bearing 74 (it could also be a sliding bearing or a swivel sliding bearing) and a non-use position N which is associated with non-use. In the use position G, the coupling body 13 projects rearwards in front of a rear of the motor vehicle 90 and also a bumper 92 so that it is accessible for the trailer 90 or load carrier 290.

The coupling arm 11 has a neck section 51, for example, on which the coupling body 13 is arranged. The neck section 51 is provided on a straight section 52 of the coupling arm 11, which projects upwards in the use position G and merges into a straight section 54 via a curved portion 53. In the use position G, the straight section 54 extends, for example, below the bumper 92. The section 54 is adjoined by a further curved portion 55 and then another straight section 56, which is connected to the bearing head 17 thus forming the holding end 16. In the non-use position N, the coupling arm 11 in FIG. 1 can be pivoted substantially behind the bumper 92 so that it does not interfere and is not visible.

The trailer 190 has a drawbar 191, for example, on the free end region of which a hitch ball coupling 192 is arranged. The hitch ball coupling 192 has a coupling receptacle 193, in which the coupling body 13 or the coupling ball 14 can be accommodated. The coupling body 13 and the coupling receptacle 192 form a swivel bearing in a manner known per se.

Figure 8:
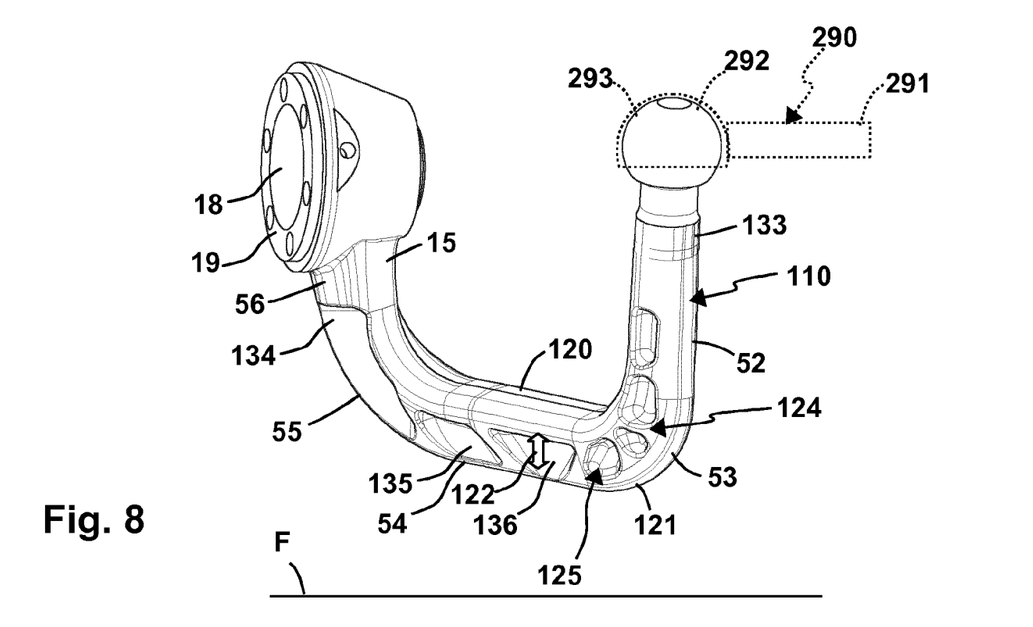
FIG. 8 shows the trailer coupling according to FIG. 7, but shown obliquely from the side.

The load carrier 290, for example a bicycle carrier, is only indicated schematically. It has a supporting structure 291, for example, in particular with carrier channels or the like, for carrying a load, in particular bicycles. A coupling device 292, for example a clamping device, is provided on the supporting structure 291 into the coupling receptacle 293 of which the coupling body 13, in particular the coupling ball 14, can sink. The coupling device 292 clamps the coupling body 13 with the help of clamping means not shown in the drawing.

The trailer 190 or the load carrier 290 can have a large mass allowing heavy strain to be placed on the coupling arm 11. Despite its lightweight construction explained below, the coupling arm 11 can withstand these strains and carry or pull corresponding loads.

The coupling arm 11 has a supporting strap 20 arranged on the top side in the use position G and a supporting strap 21 which is arranged on the bottom or underside in the use position G, which have a transverse distance 22 relative to each other. The supporting straps 20, 21 extend between the longitudinal end regions 12, 15 with a longitudinal extent 23, which corresponds to the longitudinal extent of the coupling arm 11, i.e. follows, for example, the sections or portions 52-56. In principle, it would now be conceivable to connect the supporting straps 20, 21 to each other by means of a continuous wall or a continuous web in the manner of a double-T profile. However, the coupling arm 11 would then be heavy in a manner known per se without demonstrating satisfactory load-bearing capacity in all situations. However, precisely this problem is not present in the case of the coupling arm 11.

The supporting straps 20, 21 are connected to each other by a lattice structure 24 or rib structure 25, which comprises a plurality of connecting struts 26, 27, 28, 29, 30, 31. The connecting struts 26-31 extend in particular in the region of the curved portion in 53, 55 and the straight sections 54, 56.

Close to the longitudinal end regions 12, 15, however, sections 32, 33 are provided, which comprise no connecting strut, i.e. have a uniform structure or a uniform cross section. The sections 32, 33 are approximately circular or elliptical or oval in cross section, for example. Other cross sections having no recesses or depressions or only small recesses and depressions in such regions of a coupling arm according to the invention are also possible by implication, for example T-profiles or double-T-profiles, triangular profiles, rectangular profiles or the like.

It would be possible in principle for the supporting straps 20, 21 to also extend into the sections 32, 33 and be connected to each other there by means of a web wall, for example, so that a double T-profile is formed.

Figures 4, 5:
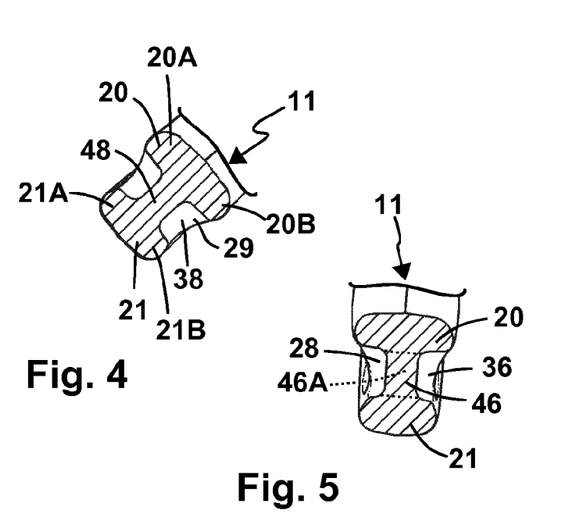
FIG. 4 shows a sectional view through the coupling arm according to FIG. 3 along a line of intersection A-A according to FIG. 3.
FIG. 5 shows a sectional view through the coupling arm according to FIG. 3 along a line of intersection B-B according to FIG. 3.
Figure 6:
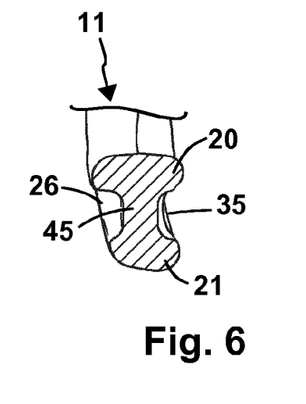
FIG. 6 shows a sectional view through the coupling arm according to FIG. 3 along a line of intersection C-C.
Figure 7:
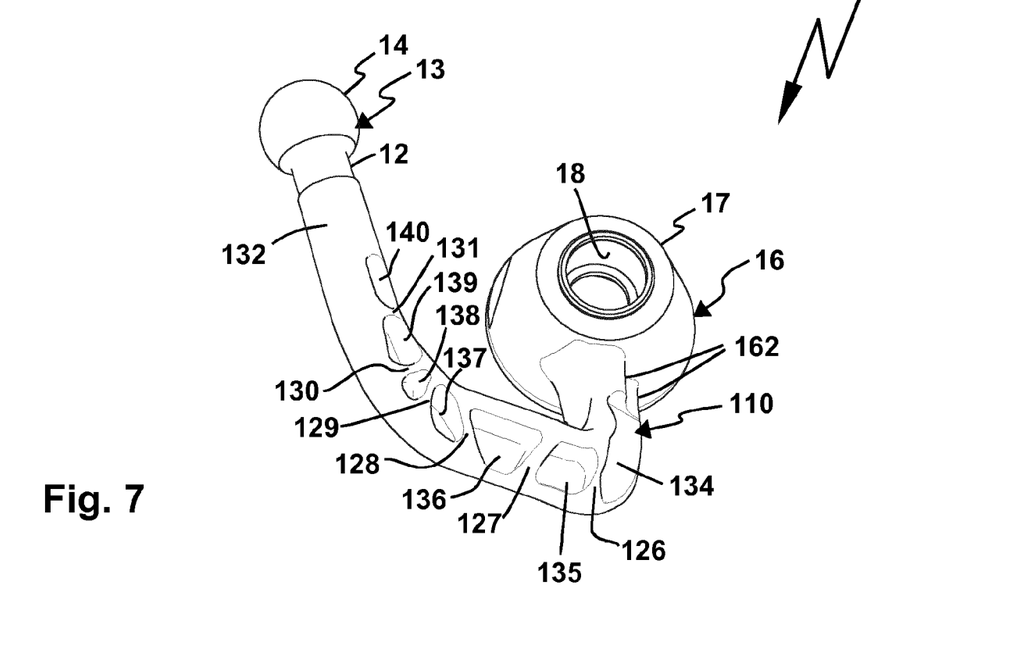
FIG. 7 shows a perspective side view of a second trailer coupling obliquely from below.

Recesses 34, 35, 36, 37, 38, 39, 40 are provided between the connecting struts 26-31, which can be open, for example, as in the case of a through-opening 46A, which is indicated in FIG. 5, but are preferably closed by wall sections 44, 45, 46, 47, 48, 49, 50. The wall sections 44-50 are narrower than portions 20A, 20B of the supporting strap 20 projecting laterally in front of the wall sections 44-50, as well as portions 21A, 21B of the supporting strap 21 (FIG. 4). A double-T profile is formed as a result.

It should be mentioned, however, that a C-shaped profile would also be possible, if, for example, only the portions 21A, 20A or 20B and 21B were provided, or a Z-shaped profile if, for example, only the portions 20A and 21B or 20B and 21A were provided. The reinforcement of the supporting straps 20, 21 by means of the connecting struts 26-31 is also possible in these cases.

A transverse width of the connecting struts 26-31 corresponds approximately to a transverse width of the supporting straps 20, 21, i.e. the transverse width including the portions 20A, 20B of the supporting strap 20 and the transverse width including the portions 21A, 21B of the supporting strap 21. The supporting strap 21 is preferably slightly narrower transversely to the longitudinal extent 23 than the supporting strap 20. Accordingly, it is advantageous, if the connecting struts 26-31 in the region of the supporting strap 20 have approximately the transverse width of the supporting strap 20 and in the region of the supporting strap 21 have the transverse width thereof. The connecting struts 26-31 thus merge as it were uniformly into the respective supporting straps 20, 21.

The recess 34 is longer with respect to the longitudinal profile 23 than the other recesses on the coupling arm 11. Accordingly, the coupling arm is relatively weak in this region, i.e. the vertical load and tensile load on the coupling body 13 is absorbed substantially by the upper and lower supporting straps 20, 21. However, the wall 44 running vertically in the use position G can support quite significant loads.

On the other hand, it can be seen, for example, that the recesses 37-40 are significantly smaller, i.e. that a relatively large number of connecting struts 29, 30, 31 are provided in the curved region or in the curved portion 53 thus achieving optimum reinforcement of the coupling arm 11. The coupling arm 11 is thus particularly rigid and resilient directly in the region of the curved portion 55.

The reverse configuration (not shown in the drawing) would also be possible by implication, which, in the region of the curved portion 55 placed under strain by relatively high torques, if a relatively high vertical load or opposite, as it were negative, vertical load HK or lifting force affects the coupling body 13 in a vertical direction in the use position G, is particularly resilient as a result of solid and/or closely spaced connecting struts (not shown).

The connecting struts 31 and 30 run substantially at right angles to the supporting straps 20, 21. However, an oblique inclination N1 and/or an oblique inclination N2 can contribute to significantly improved load-bearing capacity, for example when the two loads HK and SK engage, see FIG. 3. The connecting struts 28, 27 are inclined obliquely in opposite directions, for example, with an oblique inclination N1 and an oblique inclination N2 relative to the longitudinal extent or the longitudinal axes L1, L2 of the supporting straps 20, 21 in the region of the straight section 54. In relation to the axes L1, L2, for example, the oblique inclinations N1 and N2 provided in an angle range of 35-55°, in particular 45°, or the complementary obtuse angle in each case.

It should be noted at this point that in the case of a coupling arm according to the invention, the supporting straps generally run parallel or substantially parallel next to each other. However, it can also be the case that supporting straps run at an angle to each other, i.e. that supporting straps running towards each other or away from each other are provided at least in sections in the case of a coupling arm, as becomes clear later in the exemplary embodiment according to FIG. 12 in connection with the receptacle 242 for a contact unit 341.

By means of the connecting struts 27, 28, compressive stress D1, which is caused by the vertical force SK and impacts on the lower supporting strap 21, can act as compensation for a tensile stress S1 caused by the load SK in the upper supporting strap 20. If, however, a compression force D2 occurs in the upper supporting strap 20 in the case of the load HK, the connecting struts 27, 28 transfer this compressive force D2 to the lower supporting strap to compensate for a tensile force S2.

It is self-evident that further connecting struts can also be inclined obliquely for advantageous transmission of force. For instance, the connecting struts 26, 27 are inclined obliquely in the same direction, while not only the connecting strut 28, but also the connecting strut 29 are inclined in the opposite direction.

In a trailer coupling 110 according to FIGS. 7-11, components of partly similar or similar type are provided as in the trailer coupling 10. To simplify matters, the same reference signs are used in some instances, and also reference signs, which are larger by 100 as in the exemplary embodiment according to FIGS. 1-6.

Figure 9:
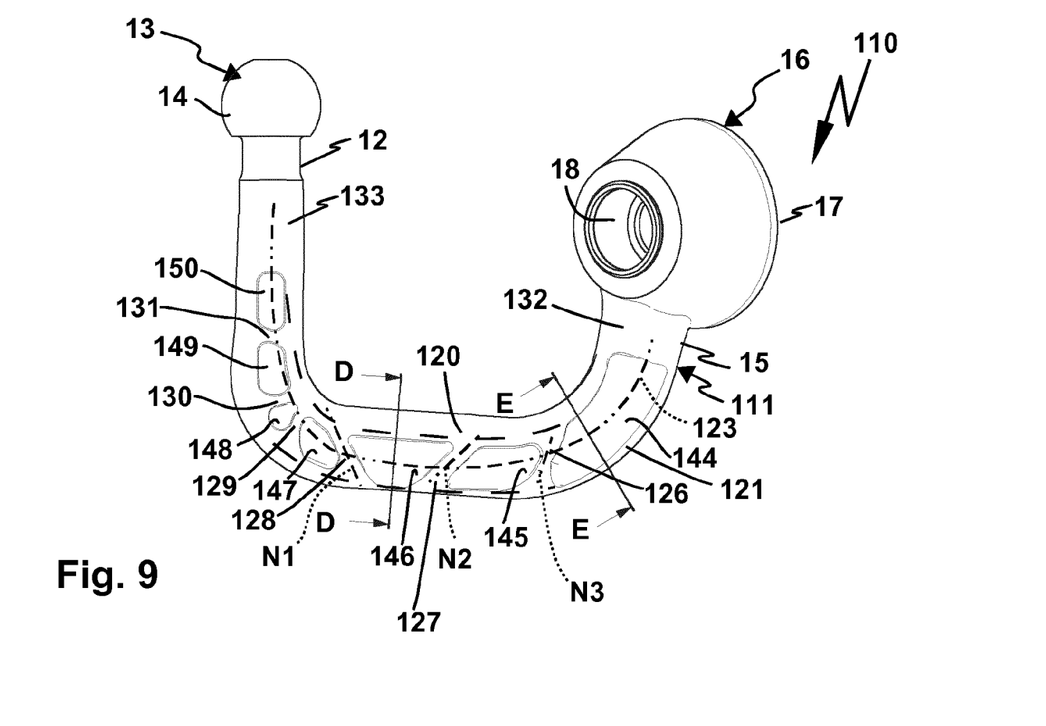

A coupling arm 111 of the trailer coupling 110 has a longitudinal extent 123 between the longitudinal end regions 12, 15 thereof, which is very similar to the longitudinal extent 23, and consequently, for example, straight sections and curved portions corresponding to the straight sections 52, 54, 56 and the curved portions 53, 55 are provided. In the manner already explained, a coupling body 13 in the form of a coupling ball 14 is provided on the longitudinal end region 12. The holding end 16 is also provided, i.e. the coupling arm 111 can also be mounted on the swivel bearing 74 or on the bearing projection 73 in a pivotable manner between the use position G and the rest position or non-use position N.

The coupling arm 111 has one supporting strap 120 which runs at the top in the use position G and one at the bottom in the use position G, i.e. supporting strap 121 running closer to a road surface F. The supporting strap 121 forms an integral component of a web 160 which projects at an angle, for example at right angles, from the supporting strap 120. An end region or end section 161 of the web 160 furthest away from the supporting strap 120 forms the supporting strap 121. Sections 120A and 120B of the supporting strap 120 project laterally in front of the web 160 so that a T-shaped cross section (see FIGS. 10 and 11) is formed. Hence, sections 120A and 120B form an upper transverse limb of the basic profile of the coupling arm 111, from which the web 160 projects as a basic limb.

The end section 161, which is closest to a road surface F, extends between the longitudinal end regions 12, 15. A lattice structure 124 or rib structure 125, which comprises connecting struts 126, 127, 128, 129, 130 and 131 extending between the supporting straps 120 and 121, is provided on the web 160 which reinforces it. In principle, the orientation of the connecting struts 126-130 is similar to that of the connecting struts 26-31 of the coupling arm 11 which have already been explained. Hence, connecting struts obliquely inclined in the same direction or obliquely inclined in the opposite direction are also provided, for example, the connecting struts 127 and 128 inclined in the opposite direction correspond in terms of function to the connecting struts 27, 28. See the explanation in connection with FIG. 3 of the previous exemplary embodiment in this respect.

Recesses 134, 135, 136, 137, 138, 139, 140 are provided between the connecting struts 126-131, the geometry and/or cross-section of which corresponds to that of the recesses 34-40 on account of the orientation and geometrical shape of the connecting struts 126-131.

Wall sections 144, 145, 146, 147, 148, 149, 150 are located in the recesses 134-140, which, are provided, for example, by the wall surface of the web 160. The connecting struts 126-131 project laterally in front of the wall surface of the web 160 and thus laterally in front of the wall sections 144-150, preferably on the two opposite front faces or end faces of the web 160, so that the latter is reinforced on both sides by the ribbing or the connecting struts 127-131.

In any case, the connecting struts 127-131 connect the supporting straps 120-121, which imparts a high load-bearing capacity to the coupling arm 111.

The connecting struts 127-131 have approximately the same transverse width as the supporting strap 120 on a foot region or on a connecting region with the supporting strap 120 and taper towards the supporting strap 121, so that a triangular shape of the connecting struts 127-131 is formed in the cross section. This can be seen on the connecting strut 127 in FIG. 10 for example.

Figure 10:
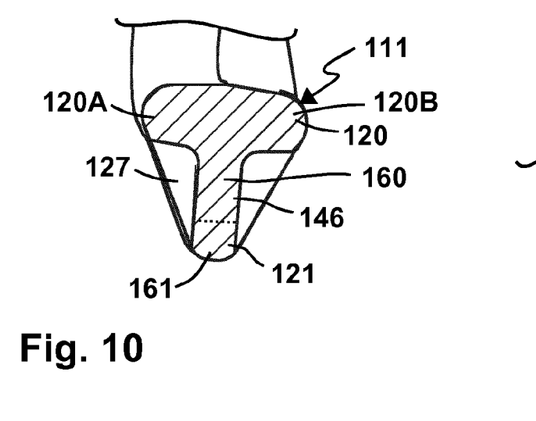
FIG. 10 shows a cross section along a line of intersection D-D in FIG. 9
Figure 11:
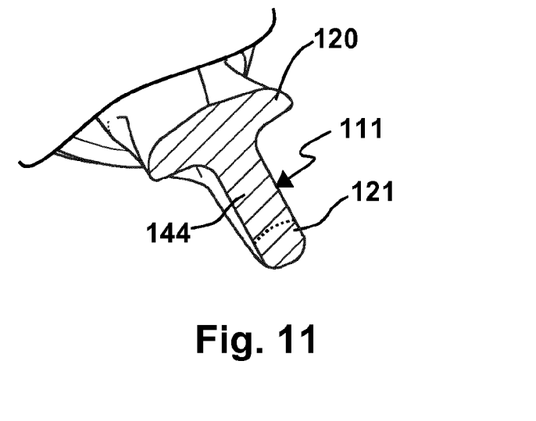
FIG. 11 shows a cross section along a line of intersection E-E in FIG. 9.

As a result, the coupling arm 111 is relatively wide in the region of the supporting strap 120 and tapers towards the supporting strap 121, which contributes to the lightweight construction. However, in spite of this intrinsically relatively filigree structure, the connecting struts 127-131 contribute effectively towards the fact that the coupling arm 111 withstands high stresses and also dynamic stresses.

As already explained in the case of the coupling arm 11, it is advantageous if the rib structure 125 or lattice structure 124 does not extend directly to the longitudinal end regions 12, 15, but that sections 132, 133 are provided without ribbing for example. However, it can be seen in FIG. 7, for example, that, preferably also in the connection region, a structure reinforced by projecting rib sections is possible between the coupling arm 111 and the holding end 16, for example with ribs 162.

Figure 12:
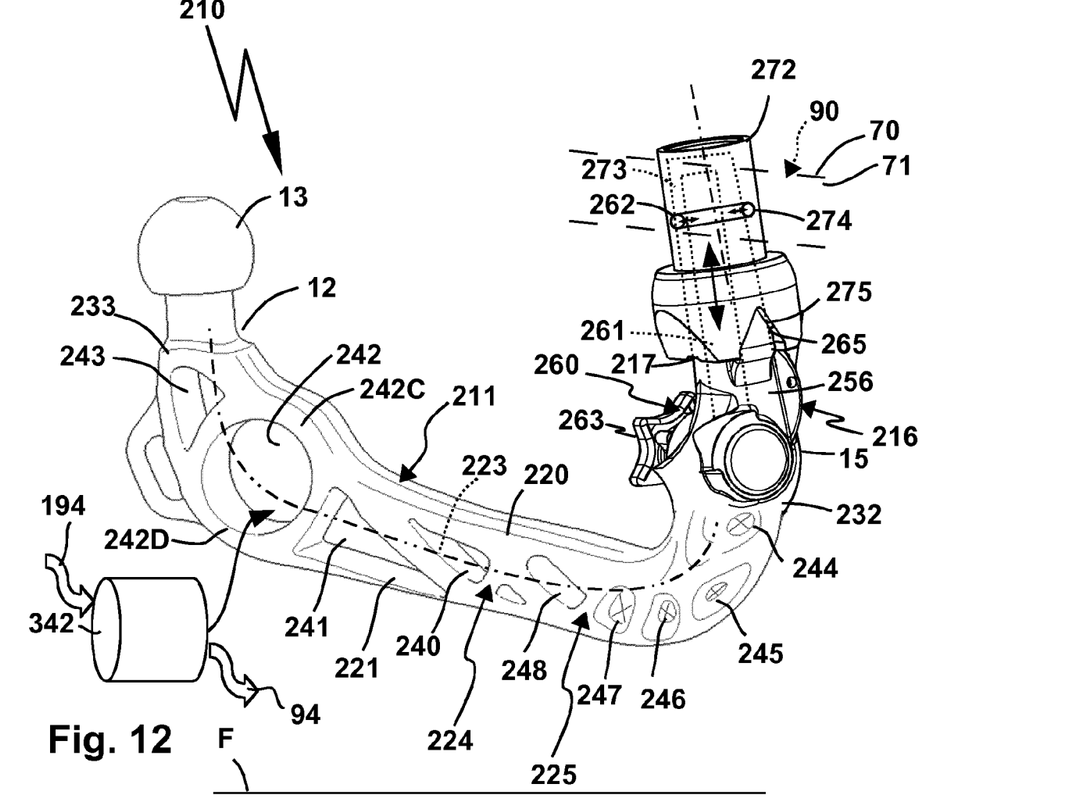
FIG. 12 shows a third trailer coupling obliquely in a perspective view, the coupling arm of which has a receptacle for a contact device.
Figure 13:
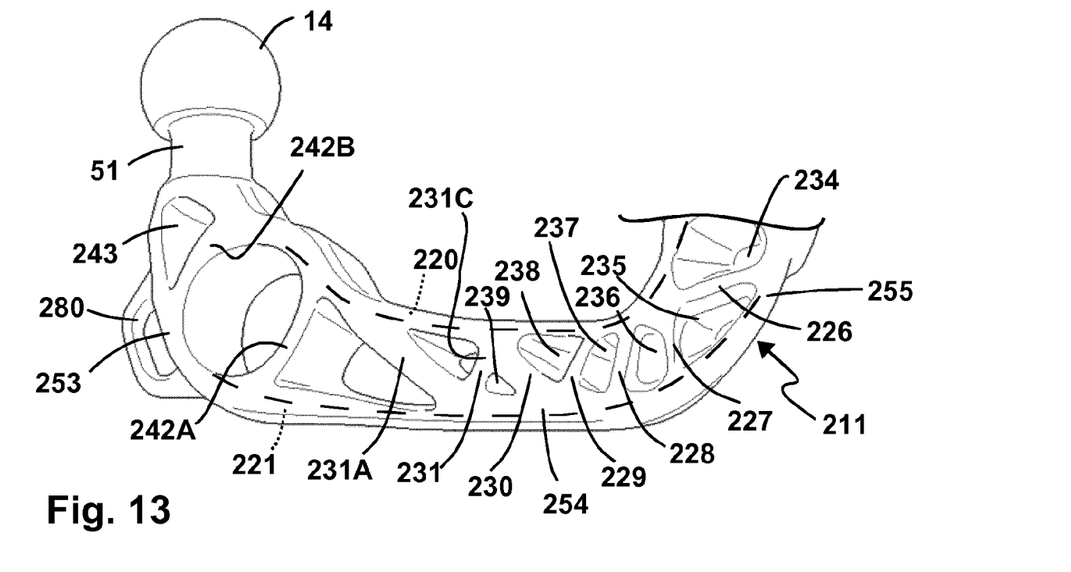
FIG. 13 shows the coupling arm of the trailer coupling from FIG. 12 from the side.

In the case of a coupling arm 211 of a trailer coupling 210 shown in FIG. 12 and FIG. 13, the features already explained, namely longitudinal end regions 12, 15, are provided between which supporting straps 220, 221 extend with a longitudinal extent 223.

A coupling ball 14 is arranged on the longitudinal end region 12 as a coupling body 13, to which, for example, the trailer 190 or the load carrier 290 can be coupled.

The coupling arm 211 has, for example, the already explained cylindrical section 51 on which the coupling body 13 is arranged, wherein in contrast to the previous embodiments, no significant straight section is provided in the manner of the section 52. On the contrary, the neck section or cylinder 51 sits directly at the end region of a curved portion 253, which in turn merges into a straight section 254. Adjoining the straight section 254 is a further curved portion 255, which is in turn adjoined by a straight section 256. The latter forms the longitudinal end or the longitudinal end region 15 or comprises the latter.

The coupling arm 211 can be removed from the motor vehicle 90 and can be arranged thereon again by means of a plug-in connection, for example. A holder 272 of the trailer coupling 210 is provided on a cross member 71 of a supporting structure 70, which is arranged and/or attached on the rear of the motor vehicle, for example, in particular the body thereof. The holder 272 is attached to the cross member 71, for example screwed on to the latter.

A plug-in projection 217 is provided on the longitudinal end region 15, i.e. a holding end 216, which can be inserted into a plug-in receptacle 273 of the holder 272.

The coupling arm 211 can be fixed to the holder 272 by means of a fixing device 260. The fixing device 260 comprises fixing bodies 262, for example balls or other similar positive locking elements, which can be brought into engagement with a positive locking receptacle or locking receptacle 274 on the plug-in receptacle 273 by an actuating body 261. For example, the actuating body 261 actuates the balls or fixing bodies 262 radially outwards from an inner space of the plug-in projection 217 through channels arranged in the latter, so that the fixing bodies 262 engage in the locking receptacle 274 in a fixing position. An actuating device with a hand wheel 263, for example, is used for in particular linear adjustment of the actuating body 261, wherein a motor-driven actuation would also be possible by implication. In order to provide additional positive-fit locking and holding, a combination of positive locking contours is also used, which comes into engagement with the plug-in projection 217 when attaching or inserting the plug-in projection 217 to or into the plug-in receptacle 273. The positive locking contours comprise, for example, wedge-shaped positive locking projections protruding laterally in front of the plug-in projection 217, which engage in corresponding, likewise wedge-shaped positive locking receptacles 275 of the holder 272.

The coupling arm 211 has connecting struts 226, 227, 228, 229, 230, 231, 231A, 242A, 242B extending between its supporting straps 220, 221, which overall form a lattice structure 224 or a rib structure 225 and thus contribute to reinforcement and at the same time to the lightweight construction of the coupling arm 211. In contrast to the previous exemplary embodiments, the rib structure 225 or lattice structure 224 extends almost entirely to the longitudinal end region 12. On the other longitudinal end region 15, on the other hand, a section 232 is provided which has no ribbing or lattice-like reinforcement. The plug-in projection 217 is provided on this section 232.

Recesses 234, 235, 236, 237, 238, 239, 240, 242, 243 are provided between the connecting struts 226-242B, which, apart from the recess 242, have no special function. The recesses 234, 235, 236, 237, 238, 239, 240, 242, 243 can be designed as through-openings, for example. However, it is also possible for walls or wall sections, for example, to be provided there. As can be seen from FIG. 12, for example, a wall section 244, 245, 246, 247, 248 is provided in each of the recesses 234, 235, 236, 237, 238.

The recess 242, on the other hand, forms a receptacle for a contact unit 342, for example a trailer socket. The contact unit 342 can be inserted into the recess or receptacle 242 transversely with respect to the longitudinal extent 223 and is held there preferably in a positive locking manner. The contact unit 342 enables, for example, the connection firstly between an on-board electrical system 94 of the motor vehicle 90 and secondly, an on-board electrical system 194 of the trailer 190 or of the load carrier 290. Thus, a lighting fixture assembly of the trailer 190 or of the load carrier 290, for example, can be supplied with power and controlled by means of the contact unit 342.

It can be seen also in the case of the coupling arm 212 that the connecting struts 226, 227, 228, 229, 230, 231, 231A, 242A, 242B oblique profiles relative to the longitudinal direction of the support strap 220 or 221 are provided in the respective section of the coupling arm 212.

Moreover, the connecting struts 242A and 242B are partially round and consequently they delimit a round inner circumference of the receptacle or recess 242, fitting with the contact unit 342.

The profile of the supporting straps 220, 221 is also adapted to the circumferential contour of the recess or receptacle 242. For example, sections 242C and 242D extend in the direction of the longitudinal extent 223 around the recess 242. It should be noted in the case of section 242C of the upper supporting strap 220 that the latter has a rounded portion.

It is also clear from the exemplary embodiment of the coupling arm 212 that connecting struts in a coupling arm according to the invention cannot only be at an angle relative to each other, for example in a v-shaped manner relative to each other, but can also have intersections. An intersection 231C is provided between the connecting struts 231 and 230, for example. It can also be said that the connecting strut 231 connects the connecting struts 231A and 230 to each other and thus provides additional reinforcement.

Furthermore, an eyelet 280 for a breakaway cable is advantageously provided on the coupling arm 211, on the supporting strap 221 for example. The eyelet 280 is thus arranged on a particularly tensile-resistant component of the coupling arm 211.

The invention claimed is:

1. A trailer coupling for a motor vehicle, comprising a coupling arm, on a first longitudinal end region of which a coupling body, for coupling a trailer or load carrier a second longitudinal end region having a holding end for holding and/or moveable mounting on a supporting structure of the motor vehicle, wherein the coupling arm comprises supporting straps which extend along a longitudinal extent of the coupling arm at a transverse distance to each other between the first and second longitudinal end regions, wherein the supporting straps are connected to each other by a plurality of connecting struts in the manner of a lattice structure or rib structure, wherein a cross section of the coupling arm through at least one connecting strut, which connects the carrying straps lying opposite each another at a transverse distance, is triangular or V-shaped.

2. The trailer coupling according to claim 1, wherein a through-opening is provided between at least two connecting struts of the plurality of connecting struts.

3. The trailer coupling according to claim 1, wherein the coupling arm has at least one receptacle for a contact unit for producing electrical and/or optical connections between an on-board electrical system of the motor vehicle and a trailer or load carrier.

4. The trailer coupling according to claim 3, wherein the receptacle is delimited on at least one side by a connecting strut extending between the supporting straps.

5. The trailer coupling according to claim 3, wherein the transverse distance between the supporting straps in the region of the receptacle for the contact unit is greater than in relation to the longitudinal extent of the coupling arm adjacent to the receptacle for the contact unit.

6. The trailer coupling according to claim 3, wherein the coupling arm comprises at least one connecting strut at a distance from the receptacle for the contact unit with respect to the longitudinal extent of the coupling arm.

7. The trailer coupling according to claim 1, wherein two of the supporting straps have a different transverse width with respect to the longitudinal extent of the coupling arm.

8. The trailer coupling according to claim 1, wherein a plug-in projection is arranged on the holding end for insertion into a plug-in receptacle of a holder of the trailer coupling, which is attached or can be attached to the motor vehicle, or a mounting head for movable mounting on a mount, which is attached or can be attached to a motor vehicle, or at least one assembly contour for assembly on the motor vehicle.

9. The trailer coupling according to claim 1, wherein the coupling body comprises a coupling ball.

10. A trailer coupling for a motor vehicle, comprising a coupling arm, on a first longitudinal end region of which a coupling body, for coupling a trailer or load carrier a second longitudinal end region having a holding end for holding and/or moveable mounting on a supporting structure of the motor vehicle, wherein the coupling arm comprises supporting straps which extend along a longitudinal extent of the coupling arm at a transverse distance to each other between the first and second longitudinal end regions, wherein the supporting straps are connected to each other by a plurality of connecting struts in the manner of a lattice structure or rib structure, wherein a supporting strap of the supporting straps transverse to the longitudinal extent of the coupling arm is at least twice as wide as another supporting strap of the supporting straps.

11. The trailer coupling according to claim 10, wherein the coupling arm has a uniform cross section without a depression and/or any connecting strut on one or both of the first and second longitudinal end regions.

12. The trailer coupling according to claim 10, wherein a cross section of the coupling arm through at least one connecting strut, which connects the carrying straps lying opposite each another at a transverse distance, is triangular or V-shaped.

13. A trailer coupling for a motor vehicle, comprising a coupling arm, on a first longitudinal end region of which a coupling body, for coupling a trailer or load carrier a second longitudinal end region having a holding end for holding and/or moveable mounting on a supporting structure of the motor vehicle, wherein the coupling arm comprises supporting straps which extend along a longitudinal extent of the coupling arm at a transverse distance to each other between the first and second longitudinal end regions, wherein the supporting straps are connected to each other by a plurality of connecting struts in the manner of a lattice structure or rib structure, wherein the coupling arm comprises at least three supporting straps which run along edge regions of the coupling arm and of which at least two supporting straps are connected to each other by a plurality of connecting struts.

14. The trailer coupling according to claim 13, wherein the coupling arm has at least one curved portion along the longitudinal extent.

15. A trailer coupling for a motor vehicle, comprising a coupling arm, on a first longitudinal end region of which a coupling body, for coupling a trailer or load carrier a second longitudinal end region having a holding end for holding and/or moveable mounting on a supporting structure of the motor vehicle, wherein the coupling arm comprises supporting straps which extend along a longitudinal extent of the coupling arm at a transverse distance to each other between the first and second longitudinal end regions, wherein the supporting straps are connected to each other by a plurality of connecting struts in the manner of a lattice structure or rib structure, wherein the coupling arm has at least one receptacle for a contact unit for producing electrical and/or optical connections between an on-board electrical system of the motor vehicle and a trailer or load carrier, wherein the transverse distance between the supporting straps in the region of the receptacle for the contact unit is greater than in relation to the longitudinal extent of the coupling arm adjacent to the receptacle for the contact unit.

16. The trailer coupling according to claim 15, wherein at least one wall section is provided transverse to the longitudinal extent of the coupling arm between at least two connecting struts of the plurality of connecting struts arranged one behind another along the longitudinal extent, wherein at least one connecting strut projects to at least one side in front of the wall section transversely to the longitudinal extent.

17. The trailer coupling according to claim 16, wherein the connecting struts arranged adjacent one another along the longitudinal extent each project from the at least one wall section on opposite sides.

18. The trailer coupling according to claim 16, wherein at least one of the supporting straps, project in front of the at least one wall section on at least one side.

19. The trailer coupling according to claim 16, wherein the supporting straps and the wall section form a T-shaped or double T-shaped or bone-shaped cross section.

20. The trailer coupling according to claim 16, wherein the wall section is narrower than at least one of the supporting straps and in a region furthest away from this supporting strap, the other supporting strap is configured as an integral part of the wall section or is formed by the wall section.

21. The trailer coupling according to claim 16, wherein the wall section projects approximately at right angles and/or approximately centrally from a longer side or flat side of at least one of the supporting straps.

22. The trailer coupling according to claim 15, wherein at least two connecting struts are adjacent to each other along the longitudinal extent to transmit tensile forces and/or compressive forces and/or tensile stresses and/or compressive stresses and/or torsions between the supporting straps to compensate for a load.

23. The trailer coupling according to claim 15, wherein at least one connecting strut has an oblique inclination with respect to the longitudinal extent of the coupling arm or is oriented with respect to the longitudinal extent of the coupling arm approximately at right angles to at least one supporting strap.

24. The trailer coupling according to claim 15, wherein the coupling arm has at least two connecting struts arranged one behind another along the longitudinal extent which have an oblique inclination in an opposite direction with respect to the longitudinal extent of the coupling arm.

25. The trailer coupling according to claim 24, wherein the connecting struts cross or are arranged one behind another without crossing with respect to the longitudinal extent and/or that the connecting struts are arranged in an X-shaped or V-shaped manner.

26. The trailer coupling according to claim 15, wherein at least two connecting struts arranged adjacent to each other with respect to the longitudinal extent, have an oblique inclination in a same direction with respect to the longitudinal extent of the coupling arm.

27. The trailer coupling according to claim 15, wherein at least one of the supporting straps extends on an upper side or lower side of the coupling arm upon the coupling arm projecting in front of a rear of the motor vehicle for supporting a load carrier or for pulling a trailer.

28. The trailer coupling a claim 15, wherein a supporting strap of the supporting straps transverse to the longitudinal extent of the coupling arm is at least twice as wide another supporting strap of the supporting straps.

29. The trailer coupling according to claim 15, wherein at least one connecting strut and/or at least one supporting strap has a rounded or curved outer contour on at least one transverse outer side and/or in that at least one connecting strut on a foot region, on which it is connected to one of the supporting straps, has a larger cross section than at an intermediate section extending between the supporting straps.

30. The trailer coupling according to claim 15, wherein a number of connecting struts and/or a cross-section or a cross-sectional area of the connecting struts is larger in a region of the holding end than in a region of the coupling body.

31. The trailer coupling according to claim 15, wherein a web projects at an angle from one supporting strap wherein a section of the web furthest away from the supporting strap forms or comprises the other supporting strap.

32. The trailer coupling according to claim 15, wherein the coupling arm comprises at least three supporting straps which run along edge regions of the coupling arm and of which at least two supporting straps are connected to each other by a plurality of connecting struts.

33. The trailer coupling according to claim 15, wherein at least one connecting strut projects approximately at right angles and/or approximately centrally from a longer side or flat side of at least one of the supporting straps.

34. The trailer coupling according to claim 15, wherein the coupling arm has at least three connecting struts along the longitudinal extent.

35. The trailer coupling according to claim 15, wherein the coupling arm and the connecting struts are made of metal and/or plastic.

* * * * *